US006456903B1

(12) United States Patent
Rosenbaum et al.

(10) Patent No.: US 6,456,903 B1
(45) Date of Patent: Sep. 24, 2002

(54) AUTOMATIC FOAM SOLUTION REGULATION FOR COMPRESSED-AIR-FOAM-SYSTEMS

(75) Inventors: Glen Var Rosenbaum, Gilbert; James W. Morand, Chandler, both of AZ (US)

(73) Assignee: EnviroFoam Technologies, Inc., Huntsville, AL (US)

( * ) Notice: Subject to any disclaimer, the term of this patent is extended or adjusted under 35 U.S.C. 154(b) by 0 days.

(21) Appl. No.: 09/287,937

(22) Filed: Apr. 7, 1999

Related U.S. Application Data
(60) Provisional application No. 60/080,990, filed on Apr. 7, 1998.

(51) Int. Cl.[7] .................................................. G05D 7/00
(52) U.S. Cl. .......................... 700/283; 702/33; 702/25; 137/5; 169/56; 239/407
(58) Field of Search .......................... 700/283; 702/112, 702/64, 22, 23, 25–27, 29, 32–33, 45, 50, 55, 114, 138, 140, 183; 169/56, 60, 14; 239/401, 402.5, 407, 398–434.5; 417/98; 137/212, 5, 93

(56) References Cited

U.S. PATENT DOCUMENTS

| 3,757,205 A | * | 9/1973 | Dauphinee | 324/444 |
| 3,889,183 A | * | 6/1975 | Teass, Jr. | 324/442 |
| 3,906,353 A | * | 9/1975 | Murdock | 324/442 |
| 4,028,618 A | * | 6/1977 | Teass, Jr. | 324/441 |
| 4,172,880 A | * | 10/1979 | Tzavos | 423/210 |
| 4,390,842 A | * | 6/1983 | Wygant et al. | 324/439 |
| 4,733,798 A | * | 3/1988 | Brady et al. | 222/23 |
| 5,023,556 A | * | 6/1991 | Miller | 324/439 |
| 5,087,883 A | * | 2/1992 | Hoffman | 324/443 |
| 5,255,747 A | * | 10/1993 | Teske et al. | 169/15 |
| 5,260,663 A | * | 11/1993 | Blades | 324/442 |
| 5,284,174 A | * | 2/1994 | Norman | 137/5 |
| 5,291,951 A | | 3/1994 | Morand | 169/14 |
| 5,411,100 A | * | 5/1995 | Larkaris et al. | 169/14 |

* cited by examiner

Primary Examiner—Leo Picard
Assistant Examiner—Chad Rapp
(74) Attorney, Agent, or Firm—Workman, Nydegger & Seeley

(57) ABSTRACT

A signal generator is electrically coupled with a first sensor for sensing the conductivity of water and electrically coupled with a second sensor for sensing the conductivity of a foam solution that included a concentration of surfactant. One or more switches repeatedly switch between the sensed conductivity of the water and the sensed conductivity of the foam solution. A conversion circuit converts the conductivity of the water into a first voltage and the conductivity of the foam solution into a second voltage, such that a single circuit path may be used to convert both conductivity values. A control circuit compares the difference of the first voltage and second voltage to determine a differential voltage that is utilized to control a surfactant control valve.

17 Claims, 9 Drawing Sheets

AUTOMATIC FOAM SOLUTION REGULATION FOR COMPRESSED-AIR-FOAM-SYSTEMS

This application is a non-provisional application having priority to U.S. provisional application No.. 60/080,990, filed on Apr. 7, 1998, the entire disclosure is incorporated herein by reference.

BACKGROUND OF THE INVENTION

The Field of the Invention

The present invention is directed to a circuit for controlling a valve regulating a surfactant mixed with water. The present invention also relates to a compressed-air-foam-system of a soap type surfactant mixed with water to provide a foam solution.

SUMMARY AND OBJECTS OF THE INVENTION

The present invention is directed to a circuit for controlling a valve regulating a surfactant mixed with water, which comprises a signal generator electrically coupled with a first sensor for sensing the conductivity of the water and with a second sensor for sensing the conductivity of the surfactant. It also includes circuit means for converting the difference between the conductivity of the water and the conductivity of the surfactant into a voltage. It also includes control means for controlling the valve using the voltage produced by the circuit means and a control voltage.

The present invention is also directed to a circuit for controlling a valve regulating a surfactant mixed with water, which comprises a sine wave generator for generating a sine wave signal coupled with a first sensor for sensing the conductivity of the water and a second sensor for sensing the conductivity of the surfactant, wherein the sine wave signal is modulated by the first and second sensor forming a first modulated sine wave and a second modulated sine wave. It also includes an oscillator, wherein the oscillator controls a pair of switches used to switch the sine wave signal from the first sensor to the second sensor repeatedly, such that a single circuit path may be used for both sensors. It also includes direct current restore circuitry for converting the first and second modulated sine waves to a first and second direct current signal. It also includes a low pass filter for removing any high frequency components from the first and second direct current signals. It also includes timing circuitry for sampling and holding the first and second direct current signals and for placing the first and second direct current signals on separate circuit paths. It also includes a differential amplifier for comparing the first and second direct current signals to produce a differential voltage. And it also includes control loop circuitry for using the differential voltage and a control voltage to regulate the valve.

The present invention also relates to a compressed-air-foam-system of a soap type surfactant mixed with water to provide a foam solution, comprising a water source in fluent contact with a first sensor for sensing the conductivity of the water. It also includes a foam solution source in fluent contact with a valve and a second sensor for sensing the conductivity of the surfactant. It also includes circuit means for converting the difference between the conductivity of the water and the conductivity of the surfactant into a voltage. And it also includes control means for controlling the valve using the voltage produced by the circuit means and a control voltage.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims. These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE PREFERRED EMBODIMENTS

System Description

Figure 1:
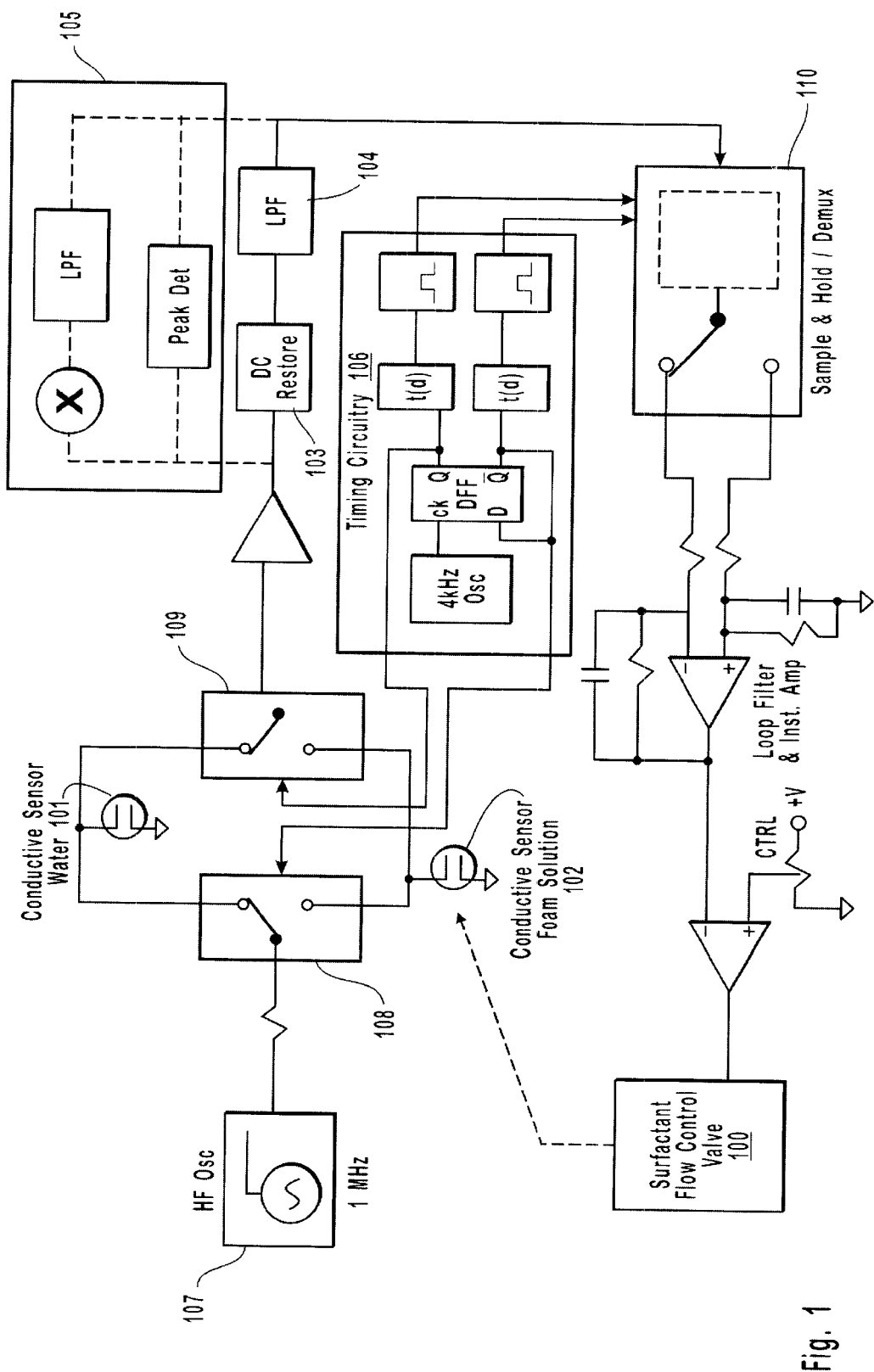
FIG. 1 is a block diagram of the inventive system.
Figure 2A:
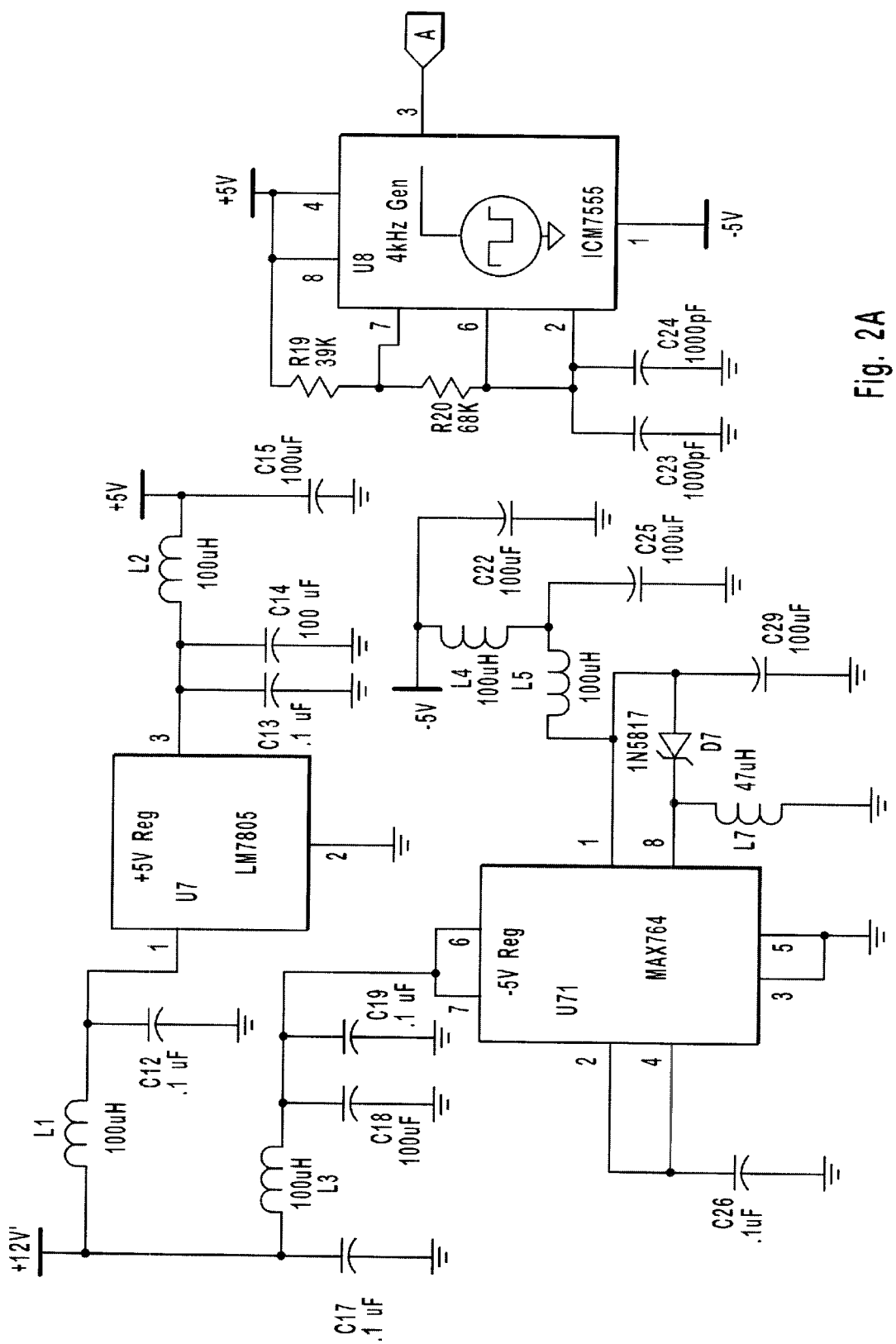
FIG. 2 is a portion of a detailed implementation of some of the system in the form of a schematic.
Figure 2B:
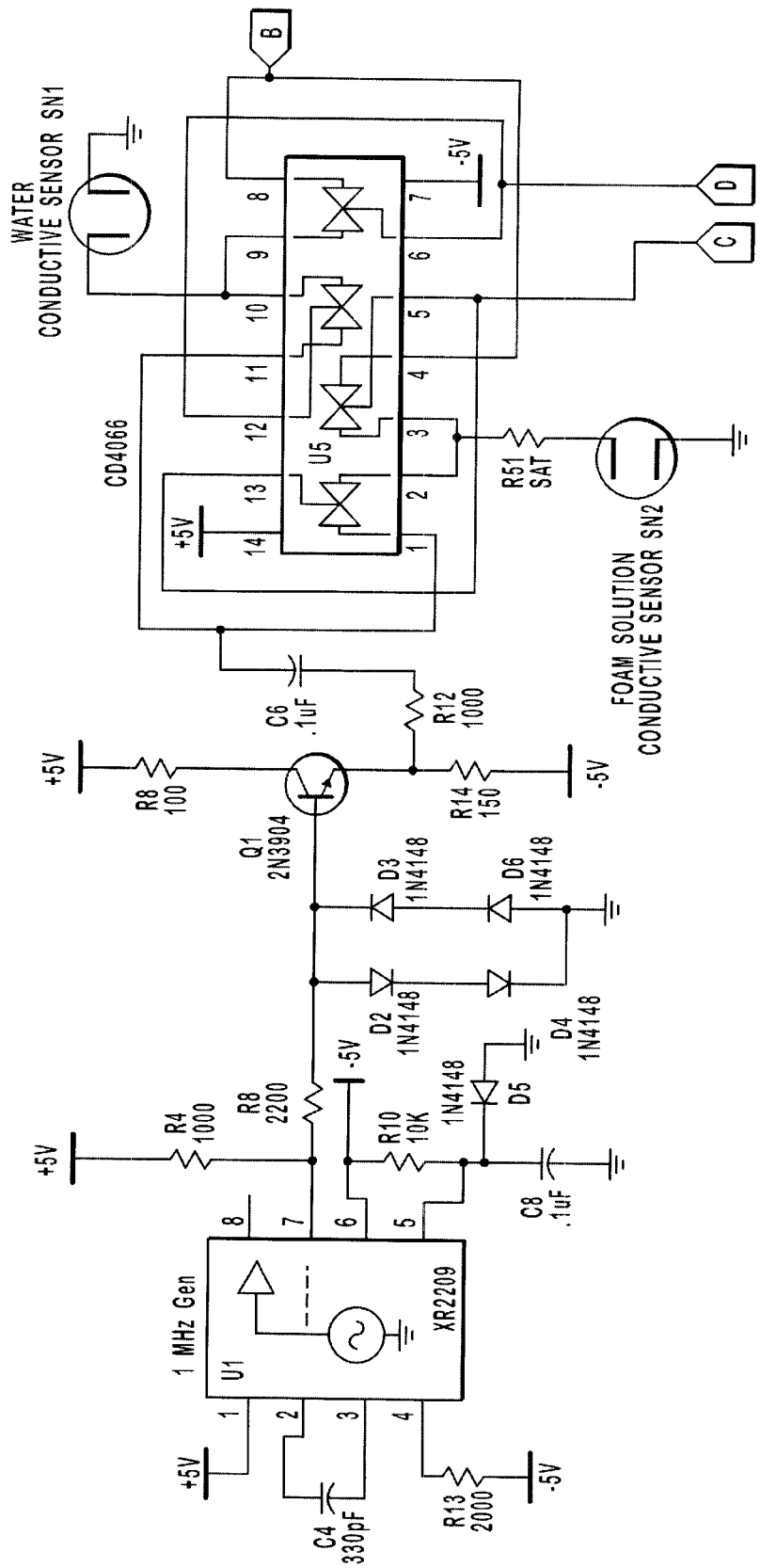
Figure 2C:
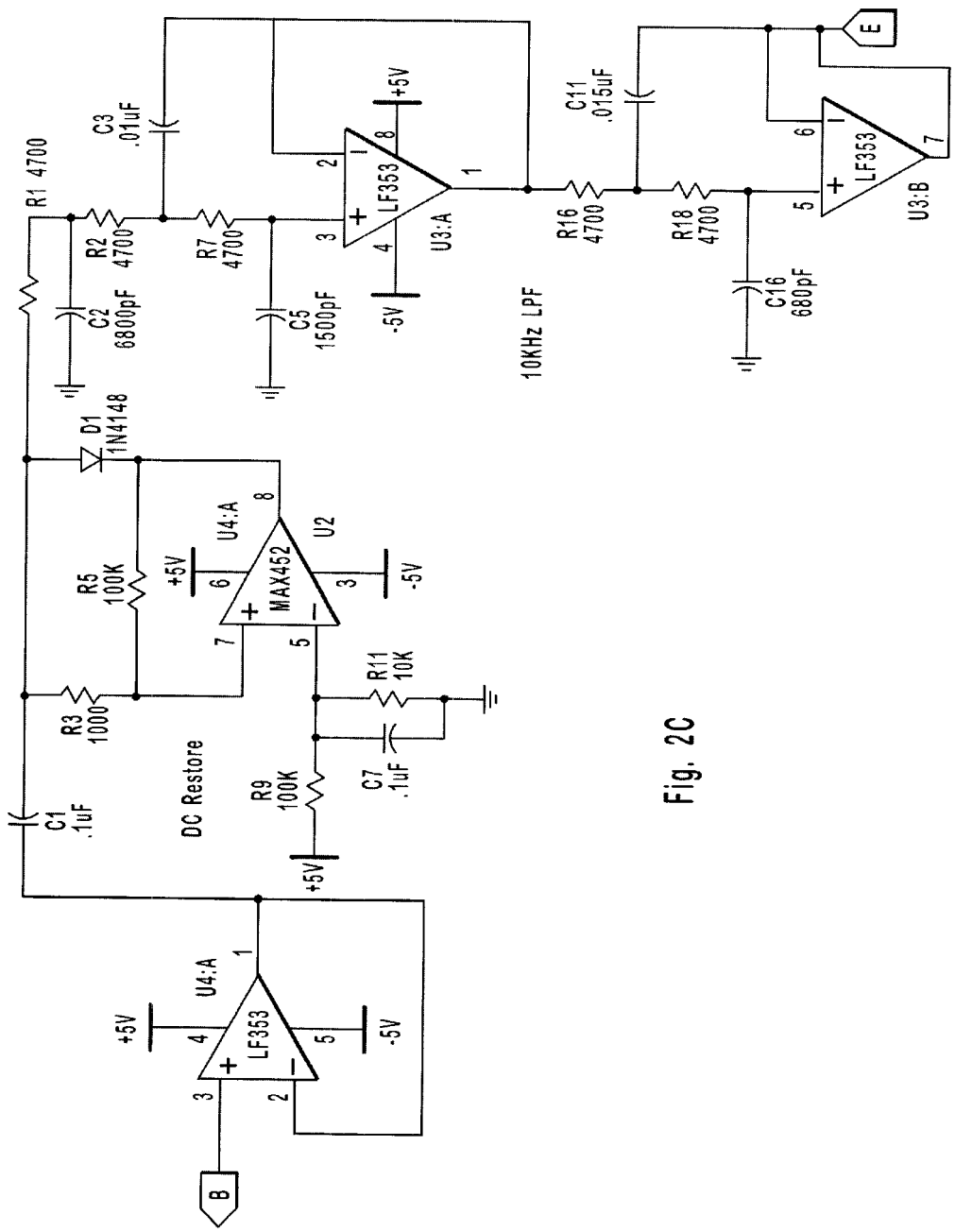
Figure 2D:
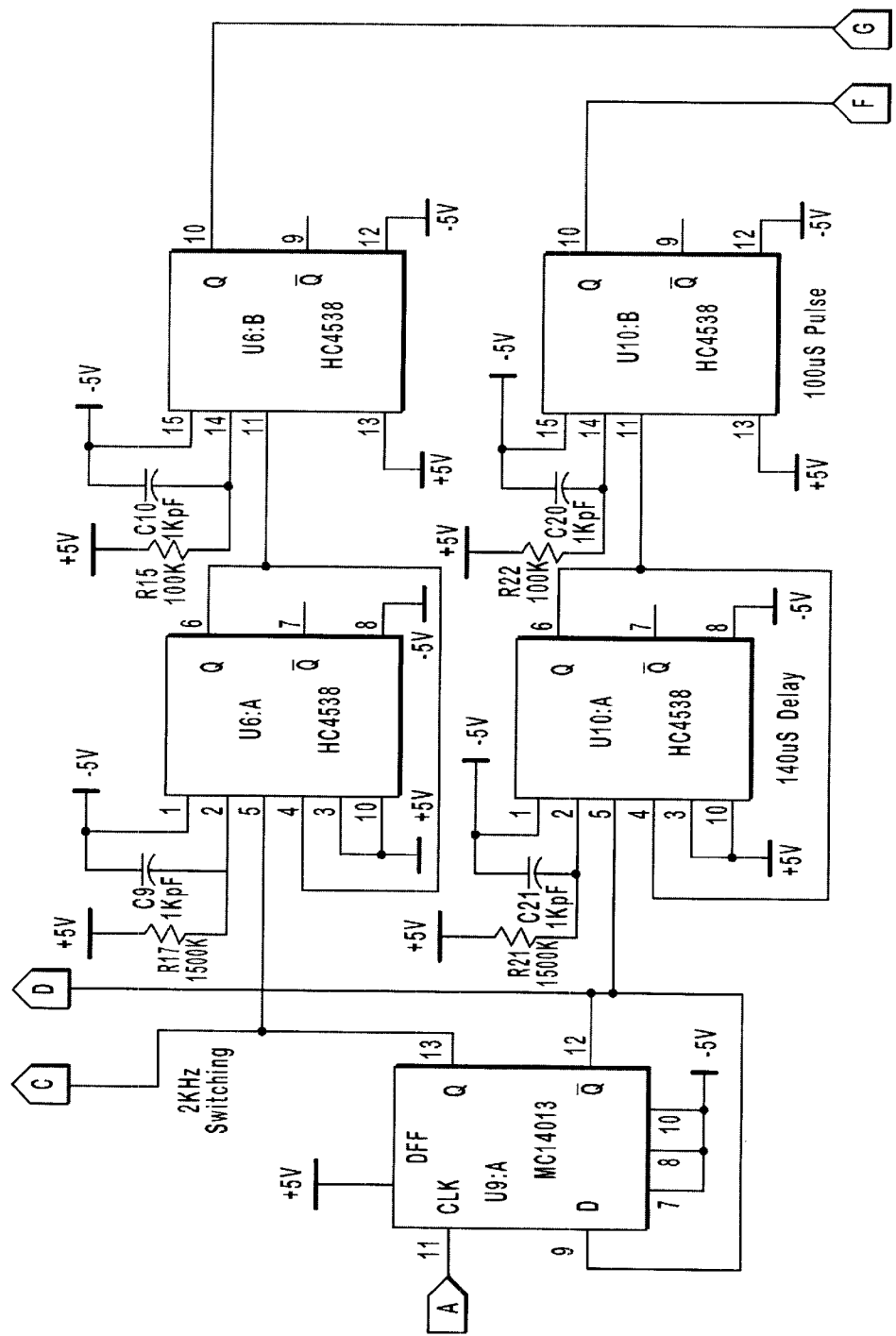
Figure 2E:
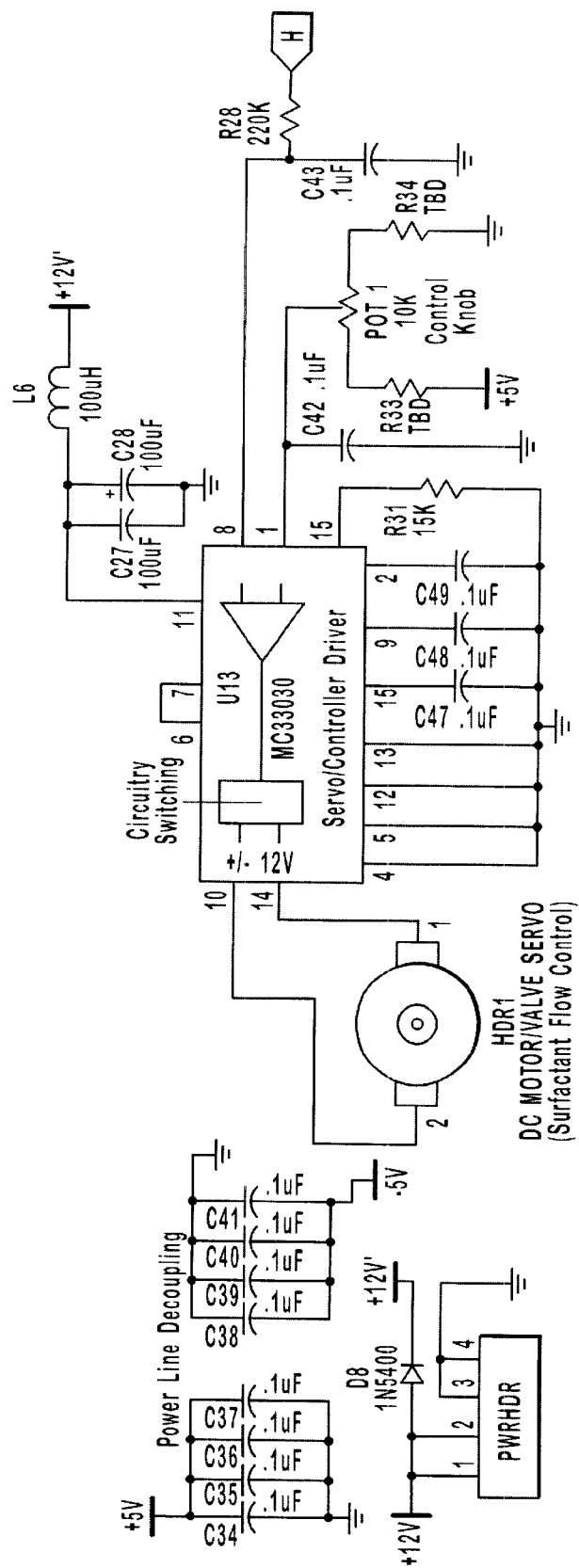
Figure 2F:
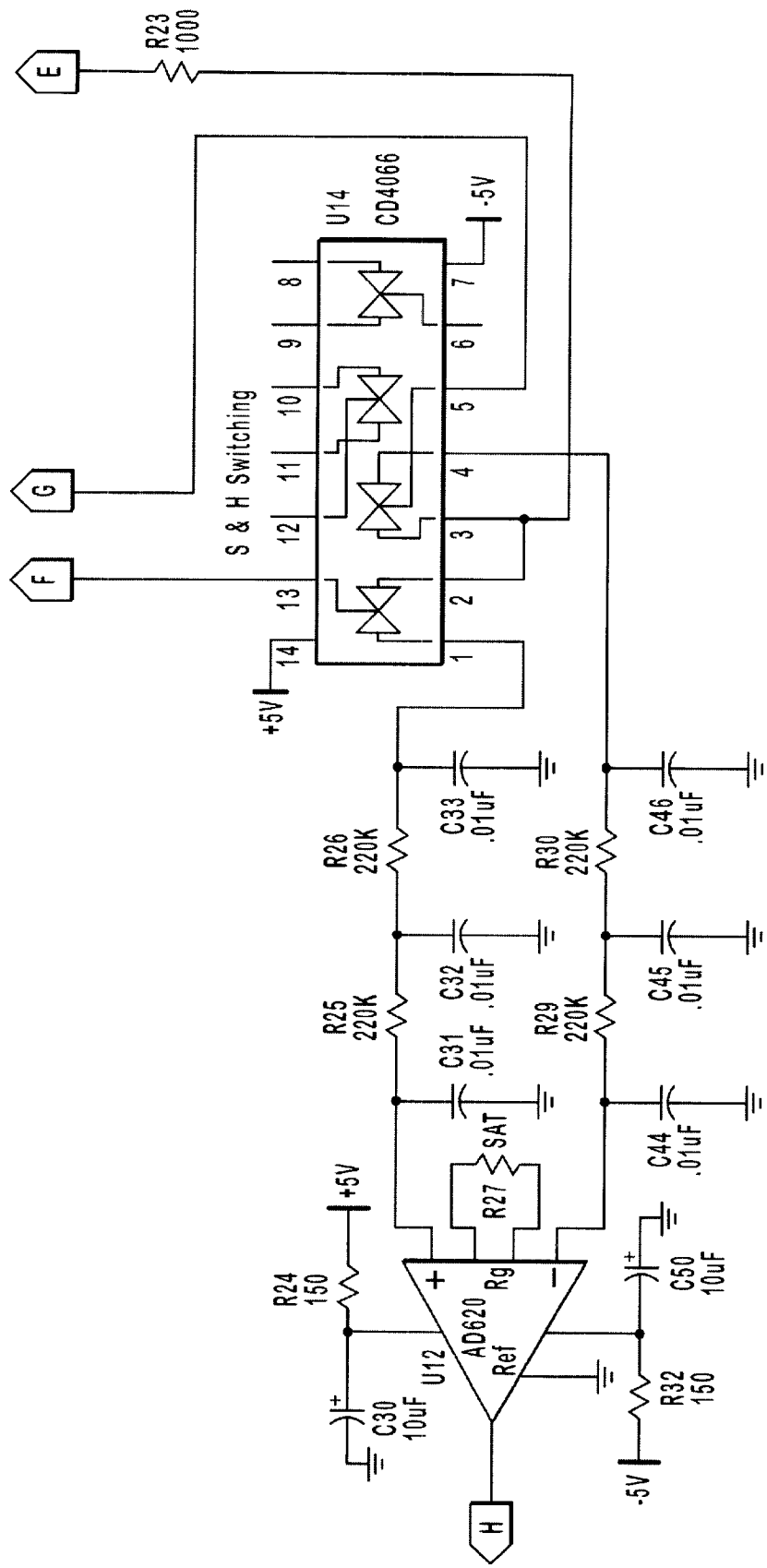
Figure 3A:
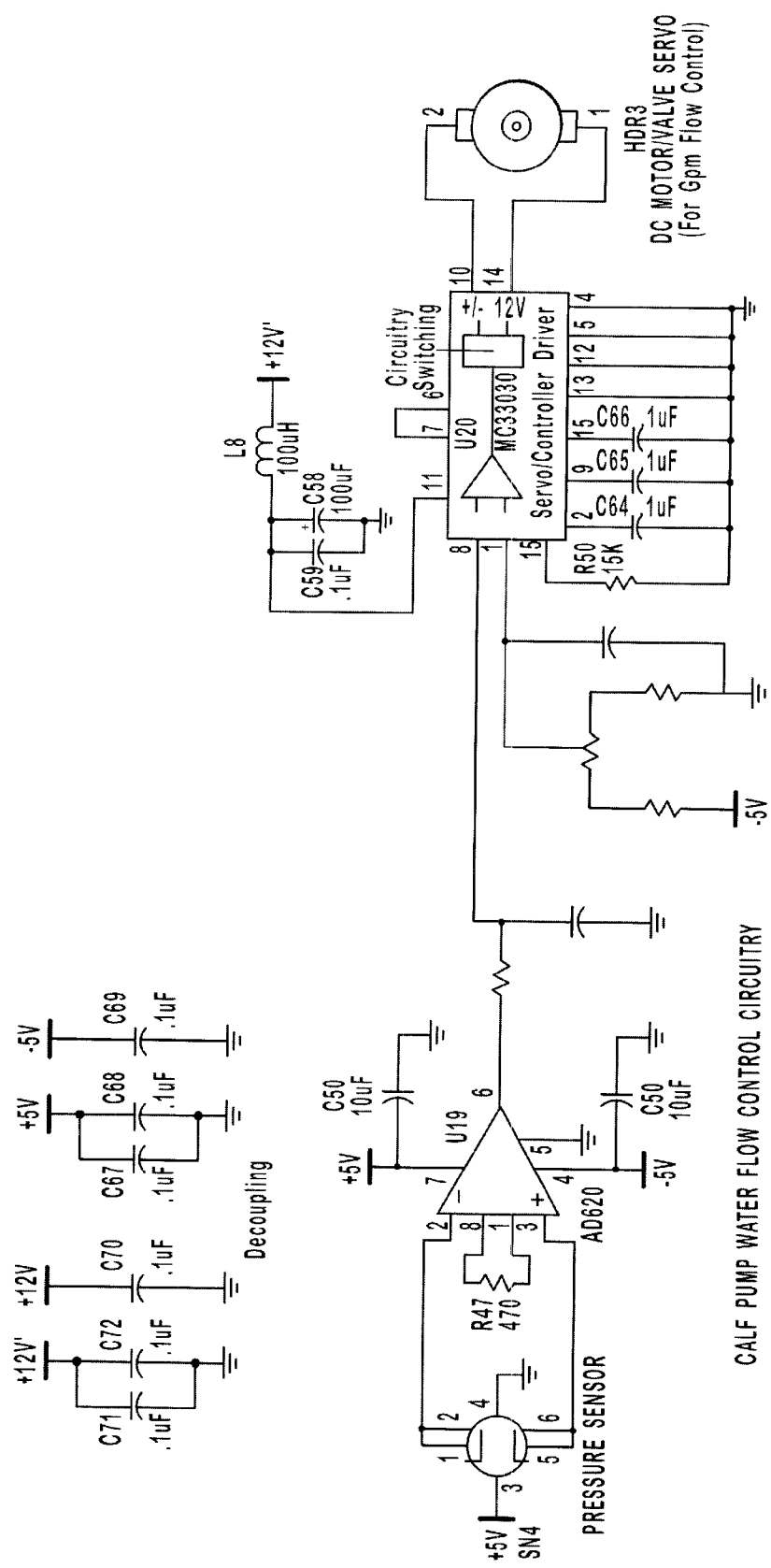
FIG. 3 is a portion of a detailed implementation of some of the system in the form of a schematic.
Figure 3B:
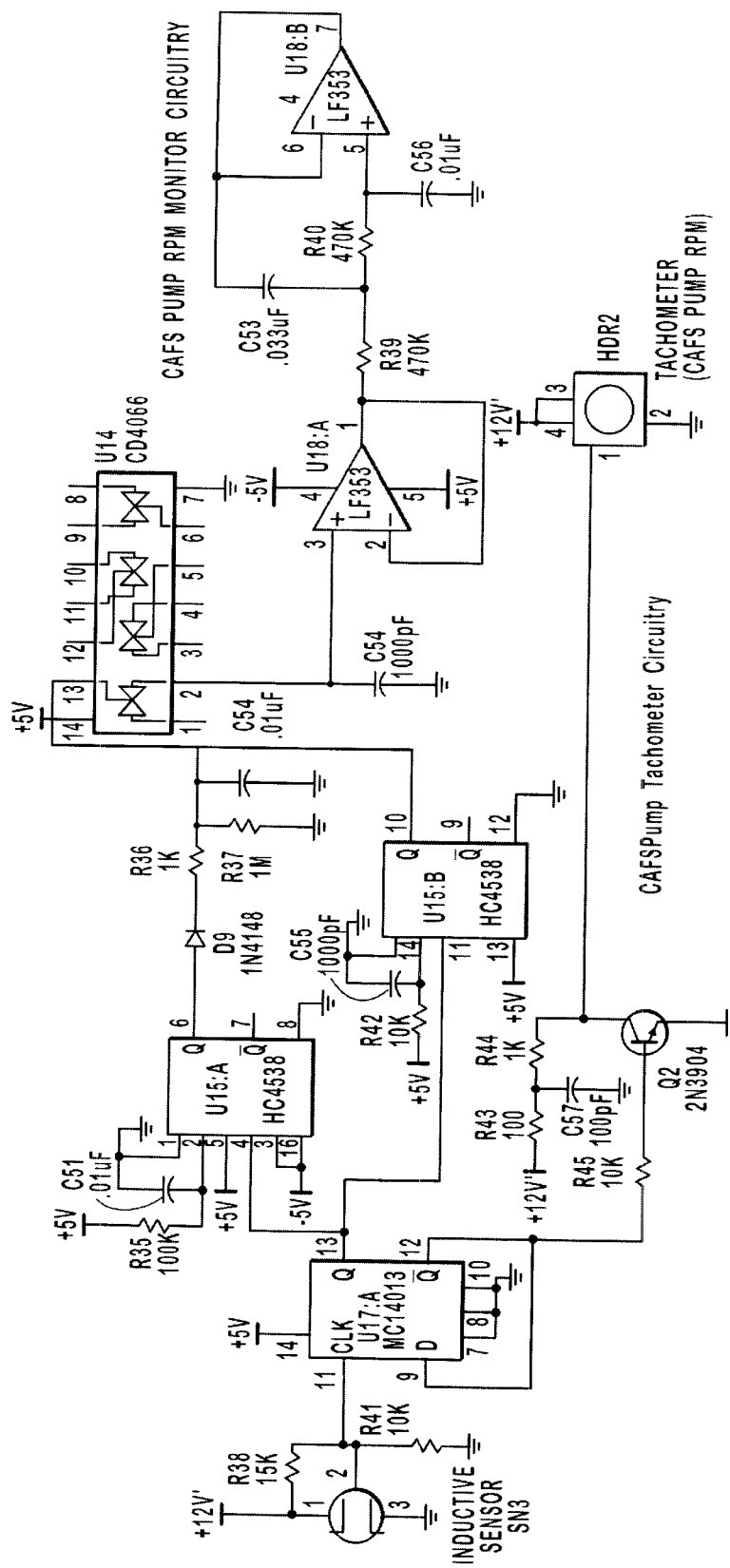

For the system description refer to the block diagram illustrated in FIG. 1. A detailed implementation is given in the attached schematics. The basic concept is to have the valve 100 control the rate of surfactant mixing with the water. This is done by measuring the electrical conductivity of the water and the foam solution flowing across respective conductivity sensors 101 and 102. The conductivity of a foam solution is lower than that of water without foam concentrate mixed in. In general, the conductivity difference (in Ohms) is converted to voltage which is used in the control loop shown. The difference voltage levels are thus a function of the concentration of the foam solution mixture.

In operation, a sine wave 107 is AC coupled across the two sensors 101 and 102. This was chosen to be 1 MHz. This HF frequency works well in water, and has sufficient response time to respond to steady state during the switching operations of switches 108 and 109. The signal is switched back and forth from the water sensor 101 to the foam solution sensor 102 at a 4 KHz rate. The faster switching rates allow for faster response during initial start up and transients.

The timing splits the HF signal into two paths. This signal is AC coupled into the sensors 101 and 102 to avoid any coating or electrolytic plating affect that a DC signal could have over time. The amplitude of the signal is loaded down in each sensor to a corresponding voltage. The signal is then multiplexed back into a single path alternating between two amplitudes.

A critical part of the general concept is that the signal processing be switched into a single path as much as possible. This way the circuitry can have DC offsets and it will not significantly matter. The important factor is the difference between the two voltages as they are processed in the loop. This allows the circuitry implementation to use less expensive components. Temperature, aging, and manufacturing changes have minimal impact. This is because although the absolute value of the two voltages going through the circuitry will change, the differential will be very nearly the same in all cases.

The HF signal then goes through a detection process. This converts the amplitude modulated AC signal to a DC signal. For linearity performance, cost, and production concerns one proven approach is with DC restore circuitry 103 followed with a low-pass-filter 104 to remove the HF AC components. Other implementations 105 are also shown in the block diagram.

The signal is now alternating between two DC voltages corresponding to the difference between the water and the foam solution conductivity. Timing circuitry 106 allows these two voltages to be alternately sampled and held at sample & hold/demux 110, and demultiplexed into two paths. One path now has a voltage corresponding strictly to the water, and the other path of course to the foam solution.

Thus, this patent disclosure presents a means to electronically control the foam system (rather than mechanically.) This allows for more accuracy and reliability. Part of the uniqueness of this patent is that the controls are not done on absolute value settings. They are done rather on an automatically adjusting floating level, which looks at the differential readings between the water and the foam solution.

The electronic controls also provide feedback-loop regulation. This automatically compensates for variances in a compressed-air-foam-system's mixing agent's properties. For example, different surfactants used may be comprised of different level of chemical concentrate. Or very commonly, the water will have different levels of hardness. These controls will automatically adjust and compensate; by providing whatever mixture is needed for a desired percentage differential between the water and the foam concentrate.

An exemplary compressed air foam pump apparatus is set forth in U.S. Pat. No. 5,291,951, the entire disclosure of which is incorporated herein by reference. The inventive system may be used in connection with the compressed air foam pump apparatus as set forth in U.S. Pat. No. 5,291,951.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A circuit for controlling a valve that regulates a rate at which surfactant is mixed with water, which comprises:
    a signal generator electrically coupled with a first sensor for sensing the conductivity of the water and electrically coupled with a second sensor for sensing the conductivity of a foam solution that includes a concentration of the surfactant;
    one or more switches used to repeatedly switch between sensing the conductivity of water at the first sensor and sensing the conductivity of the foam solution at the second sensor;
    a conversion circuit utilizing a single circuit path for converting both the conductivity of the water into a first voltage and the conductivity of the foam solution into a second voltage; and
    a control circuit for controlling the rate surfactant is released at the valve by utilizing the difference of the first voltage and the second voltage and a control voltage.

2. The circuit as recited in claim 1, wherein the signal generator comprises a sinusoidal wave generator.

3. The circuit as recited in claim 1, wherein the conversion circuit comprises a low pass filter, for removing high frequency components from the direct current signal.

4. The circuit as recited in claim 1, wherein the conversion circuit comprises a direct current restore circuit, for converting a signal into a direct current signal.

5. The circuit as recited in claim 4, wherein the conversion circuit comprises a direct current restore circuit, for converting an alternating current signal into a direct current signal.

6. The circuit as recited in claim 1, wherein the conversion circuit comprises a peak detection circuit.

7. The circuit as recited in claim 1, wherein the control circuit comprises the following:
    a first operational amplifier for comparing the first voltage to the second voltage to produce a differential voltage; and
    a second operational amplifier coupled to the valve for comparing the differential voltage to a control voltage.

8. The circuit as recited in claim 1, further comprising a timing circuit for sampling the first voltage and the second voltage.

9. The circuit as recited in claim 8, wherein the timing circuit comprises a demultiplexer for storing samples of the first voltage and samples of the second voltage and for causing the first voltage and second voltage to be asserted on different circuit paths.

10. A circuit for controlling a valve regulating a surfactant mixed with water, which comprises:
    a sine wave generator for generating a sine wave signal coupled with a first sensor for sensing the conductivity of the water and a second sensor for sensing the conductivity of a foam solution, wherein the sine wave signal is modulated by the first and second sensor forming a first modulated sine wave and a second modulated sine wave;
    an oscillator, wherein the oscillator controls a pair of switches used to switch the sine wave signal from the first sensor to the second sensor repeatedly, such that a single circuit path may be used for both sensors;
    direct current restore circuitry for converting the first and second modulated sine waves to a first and second direct current signal;
    a low pass filter for removing any high frequency components from the first and second direct current signals;
    timing circuitry for sampling and holding the first and second direct current signals and for placing the first and second direct current signals on separate circuit paths;
    a differential amplifier for comparing the first and second direct current signals to produce a differential voltage; and
    control loop circuitry for using the differential voltage and a control voltage to regulate the valve.

11. A compressed-air-foam-system of a soap type surfactant mixed with water to provide a foam solution, comprising:
    a water source in fluent contact with a first sensor for sensing the conductivity of the water;
    a surfactant source in fluent contact with a valve and in fluent contact with a second sensor for sensing the conductivity of a foam solution;
    one or more switches used to repeatedly switch between sensing the conductivity of water at the first sensor and sensing the conductivity of the foam solution at the second sensor;

a conversion circuit utilizing a single circuit path for converting the difference between the conductivity of the water and the conductivity of the foam solution into a differential voltage; and a control circuit for controlling the rate surfactant is released at the valve by comparing the differential voltage and a control voltage.

12. The compressed-air-foam system as recited in claim 11, wherein the conversion circuit comprises the following:

a direct current restore circuit, for converting a signal into a direct current signal; and a low pass filter, for removing high frequency components from the direct current signal.

13. The compressed-air-foam system as recited in claim 11, wherein the conversion circuit comprises a peak detection circuit.

14. The compressed-air-foam system as recited in claim 11, wherein the control circuit comprises a first operational amplifier for comparing the first voltage to the second voltage to produce a differential voltage.

15. The compressed-air-foam system as recited in claim 14, wherein the control circuit further comprises a second operational amplifier for comparing the differential voltage to a control voltage.

16. The compressed-air-foam system as recited in claim 11, further comprising a timing circuit for sampling the first voltage and the second voltage.

17. The compressed-air-foam system as recited in claim 16, wherein the timing circuit comprises a demultiplexer for storing samples of the first voltage and samples of the second voltage and for causing the first voltage and second voltage to be asserted on different circuit paths.

* * * * *

UNITED STATES PATENT AND TRADEMARK OFFICE
CERTIFICATE OF CORRECTION

PATENT NO. : 6,456,903 B1
DATED : September 24, 2002
INVENTOR(S) : Glen Var Rosenbaum and James W. Morand It is certified that error appears in the above-identified patent and that said Letters Patent is hereby corrected as shown below:

Column 3,
Line 30, change "level" to -- levels --

Column 4,
Line 5, change "the" to -- a --

Column 6,
Lines 3, 10 and 11 change "the" to -- a -- in both occurrences

Signed and Sealed this

Fourth Day of March, 2003

JAMES E. ROGAN
*Director of the United States Patent and Trademark Office*